(12) United States Patent
Kessler et al.

(10) Patent No.: US 8,793,325 B2
(45) Date of Patent: Jul. 29, 2014

(54) TIME AND EVENT CONTROLLED MESSAGE PROCESSING

(75) Inventors: Joerg Kessler, Nussloch (DE); Stefan Rossmanith, Walldorf (DE); Christoph Hofmann, Wiesloch (DE); Peter Surma, Heidelberg (DE); Andreas Dahl, Rauenberg (DE)

(73) Assignee: SAP AG, Walldorf (DE)

( * ) Notice: Subject to any disclaimer, the term of this patent is extended or adjusted under 35 U.S.C. 154(b) by 2055 days.

(21) Appl. No.: 10/899,633

(22) Filed: Jul. 26, 2004

(65) Prior Publication Data

US 2006/0020678 A1    Jan. 26, 2006

(51) Int. Cl.
*G06F 15/16* (2006.01)

(52) U.S. Cl.
USPC ............ 709/207; 709/206; 718/102; 370/235

(58) Field of Classification Search
USPC .................... 709/207, 206; 718/102; 370/235
See application file for complete search history.

(56) References Cited

U.S. PATENT DOCUMENTS

| | | | |
|---|---|---|---|
| 5,902,352 A * | 5/1999 | Chou et al. | 718/102 |
| 7,287,060 B1 * | 10/2007 | McCown et al. | 709/206 |
| 2003/0023736 A1 * | 1/2003 | Abkemeier | 709/229 |
| 2003/0135575 A1 * | 7/2003 | Marejka et al. | 709/207 |
| 2003/0218981 A1 * | 11/2003 | Scholten | 370/235 |
| 2005/0038863 A1 * | 2/2005 | Onyon et al. | 709/207 |

* cited by examiner

*Primary Examiner* — Phuoc Nguyen
*Assistant Examiner* — Kishin G Belani
(74) *Attorney, Agent, or Firm* — Mintz Levin Cohn Ferris Glovsky and Popeo, P.C.

(57) ABSTRACT

A system and method for filtering messages in a messaging system is described. The system includes a user interface configured to receive user input for defining one or more message filters. Each message filter specifies predefined criteria by which a message is to be stopped. The system further includes a filter module comprising the one or more filters, and a queue connected with the filter module for queuing messages stopped according to one of the one or more filters. In a method, messages in the messaging system are stopped according to predefined criteria. Stopped messages are restarted according to a job executed by the messaging system.

18 Claims, 3 Drawing Sheets

TIME AND EVENT CONTROLLED MESSAGE PROCESSING

BACKGROUND

This description relates to techniques for processing asynchronous messages at predefined times in a messaging system.

Enterprise systems using a client/server application arrangement may use a messaging system. Examples of such enterprise systems include a resource management system (RMS), a customer relationship management (CRM) system, a human resource management (HRM) system, a supply chain management (SCM) system, and a financial management (FM) system. In such exemplary enterprise systems, a sender system uses a messaging system to send information, typically in the form of asynchronous messages, to one or more receiver systems. Sender and receiver systems may use proxies to communicate with the messaging system. Proxies are technically part of the messaging system, but are located in the respective sender or receiver system.

Messaging systems may include client applications acting as the sender and/or receiver systems, which alternate between being online and offline. When a receiver system is offline, messages sent to that receiver system will not be received, and an error message will be generated. This can consume large amounts of resources to send both messages and the error messages. In a worst case, all messages must be restarted manually.

Messages may or may not be dependent on the processing state of other messages in the receiver systems. If a message is dependent, a queuing function can be used to guarantee an order of delivery to the intended receiver systems for processing. The messages may also be processed within the messaging system. For example, the messaging system may perform routing based on the content of messages, or perform mapping functions to map the message to the one or more receiver systems. This processing also can consume large amounts of time and other resources of the messaging system.

SUMMARY

A messaging system includes a mechanism and technique to filter messages sent by a sender system to stop message processing. At a predefined time or based on a predefined external event, processing of filtered messages is resumed. The time and/or event is defined according to a job. The filter operates according to one or more filter criteria, which can include the content of the message, sender and receiver properties, queue order, and/or the message type and size. The filter can be implemented in a central enterprise exchange platform that connects the sender system with one or more receiving systems. Alternatively, the filter can be implemented within a proxy/adapter associated with the sender system and/or receiver system. In the latter implementation, the proxy can filter, store, and restart messages either on an inbound interface or on an outbound interface.

According to one embodiment, a system for filtering messages in a messaging system is described. The system includes a user interface configured to receive user input for defining one or more message filters. Each message filter specifies predefined criteria by which a message is to be stopped. The system further includes a filter module comprising the one or more filters, and a queue connected with the filter module for queuing messages stopped according to one of the one or more filters.

In another embodiment, a computer-implemented method of processing asynchronous messages in a messaging system, includes the steps of stopping messages in the messaging system according to predefined criteria, and restarting stopped messages according to a job executed by the messaging system.

The details of one or more embodiments are set forth in the accompanying drawings and the description below. Other features, objects, and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a messaging system that is configured to selectively filter and store messages being sent from a sender system to one or more receiver systems. The messaging system is further configured to resume sending the filtered messages according to a job and at a time when the receiver system is online. A job defines messaging transactions between a sender system and receiver system according to predefined set of business processes.

Figure 1:
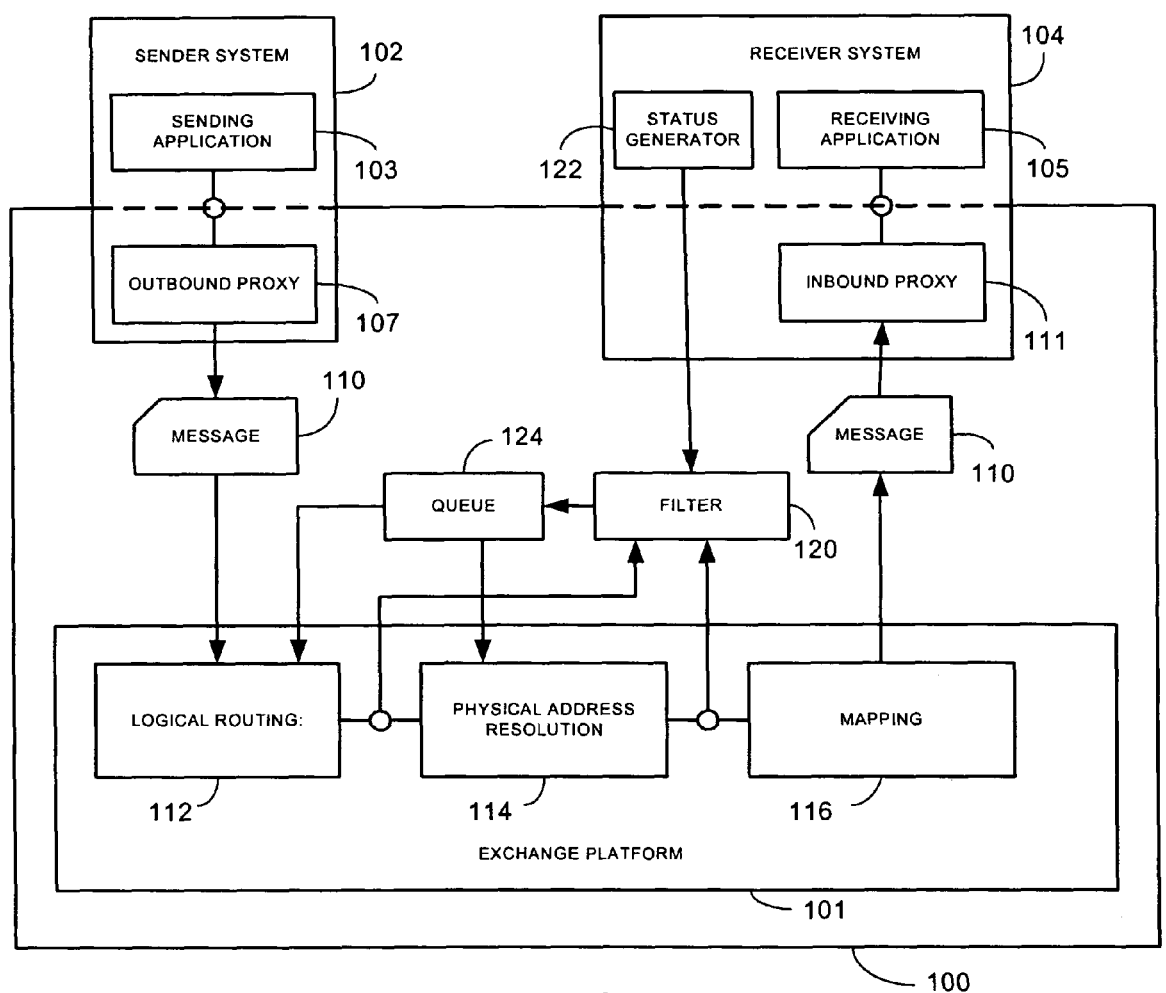
FIG. 1 is a block diagram of a messaging system for an enterprise system.

FIG. 1 is a block diagram of an exemplary embodiment of a messaging system 100 for an enterprise system. A sender system 102 includes hardware and/or software to host a sending application 103. One or more receiver systems 104 each includes one or more receiving applications 105. A communication path for a message 110 can include an outbound proxy 107 at the outbound interface from the sender system 102, through an exchange platform 101 and ultimately to the receiver system 104.

The receiver system 104 may also utilize an inbound proxy 111 or an adapter (not shown) to communicate with the sender system 102 via the exchange platform 101. The exchange platform 101 of the messaging system 100 includes a logical routing module 112 for logical receiver determination based on business- or enterprise-level routing rules, and a physical address resolution module 114 for determining physical and/or technical receiver address information. The exchange platform 101 may also include a mapping module 116 for transforming messages from a sender format and values into a receiver format and values. The configuration and connectivity of the enterprise system shown is merely exemplary, and it should be noted that such configuration and connectivity could take any number of forms. For synchronous communication, routing and physical address resolution is needed only for the request, as the response is transferred to the sender, which is already known.

The messaging system 100 further includes a filter module 120 providing one or more message filters, and a queue 124 for storing filtered messages. The queue 124 also is configured to resume sending filtered messages according to a time and/or event specified by the filter used to stop message processing. A filter can be implemented in the exchange platform 101, or within a proxy 107/111 associated with the sender system 102 and/or receiver system 104, respectively. In the proxy implementation, the proxy can filter, store, and restart messages either on an inbound interface or on an outbound interface.

Each filter in the filter module 120 operates according to one or more filter criteria, which can include the content of the message, sender and receiver properties, queue order, and/or the message type and size. At a predefined time or based on a predefined external event, or both, the processing of filtered messages is resumed. The time and/or event according to which messages are filtered are/is defined by a job. A job relates to a messaging transaction between a sender system 102 and receiver system 104, and is typically executed according to predefined set of business processes (i.e. data processing and communications between business software systems).

In the exemplary embodiment, the filter can be implemented in the messaging system 100 to stop processing of messages at any point, preferably at the point in which they were stopped during normal processing to reduce redundancy and conserve processing resources. For example, the filter can stop message processing after logical routing by the logical routing module 112 and store the filtered messages in the queue 124. According to a job, the delivery of the messages is resumed.

Another exemplary embodiment includes the messaging system 100 sending messages from a sender system 102 to one or more receiver systems 104 based on an online status of each of the receiver systems 104. Accordingly, each receiver system 104 can include a status generator 122 that is configured to generate and send a message to the messaging system 100 that the receiver system 104 and/or its receiving application 105 is, or will be going, offline or online.

The messaging system 100 is configured to receive the message indicating the online or offline status of the receiver system 104, and send messages directed to the receiver system 104 accordingly. When the receiver system goes offline, the messaging system 100 stops sending selected messages to the receiver system and stores the messages in a memory in the queue 124. The messaging system 100 is configured to receive the status messages indicating the online or offline status of the receiver system, and either send or stop sending messages accordingly. Thus, messages can be selectively and dynamically filtered to accommodate the availability of the receiver system 104.

In another embodiment, the filter 120 can selectively stop sending incoming messages, and store those messages in the queue 124 for later processing, particularly during workload peaks. This is particularly useful where the messaging system 100 performs a number of complex or priority-driven operations on the incoming messages. Thus, more complex operations or higher-priority messages can be processed by the messaging system first. Less complex or lower-priority messages can be processed at times when there are fewer messages, especially when large messages are present. This also allows for shifting message processing and transmission from high-traffic or high resource-consumptive processing times to low-traffic or low resource-consumptive times to reduce message transfer costs and to avoid workload peaks.

Figure 2:
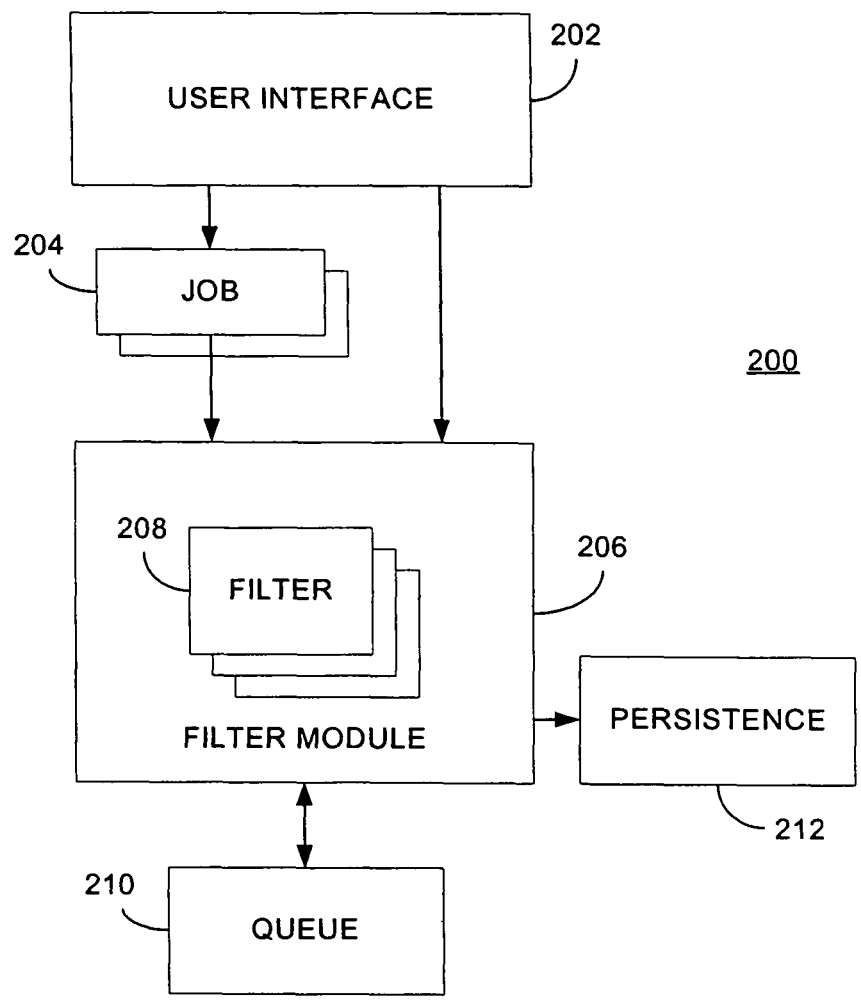
FIG. 2 is a block diagram of a filtering system for a messaging system.

FIG. 2 shows a filtering system 200 for a messaging system. The filtering system 200 includes a user interface 202 and a filter module 206. The user interface 202 allows a user to define one or more jobs 204 that specifies parameters according to which messages are to be filtered. The jobs are executed by a job engine in the messaging system or the proxy. The user interface 202 also allows a user to directly define one or more message filters 208 in the filter module. In an embodiment, the user interface 202 specifies message attributes such as sender and receiver, message size, message type, queue and location of the filter within the messaging system, etc. Each message filter 208 may be related to a job 204 that is stored in a messaging system and executed during messaging transactions. A number of message filters 208 can be combined to form a complex filter.

A message filter 208 may be associated with a queue 210. Such a queue is useful when a group of filtered messages are dependent on each other, i.e. must arrive in a particular order, such as indicated by a timestamp when the message reaches the location at which it is filtered. If queuing is needed, then the pertinent message filter 208 stops the queue 210 to filter the messages, and no check during runtime is necessary. If queuing is unneeded, the message filter 208 may provide a persistence layer 212 to persist the message.

Figure 3:
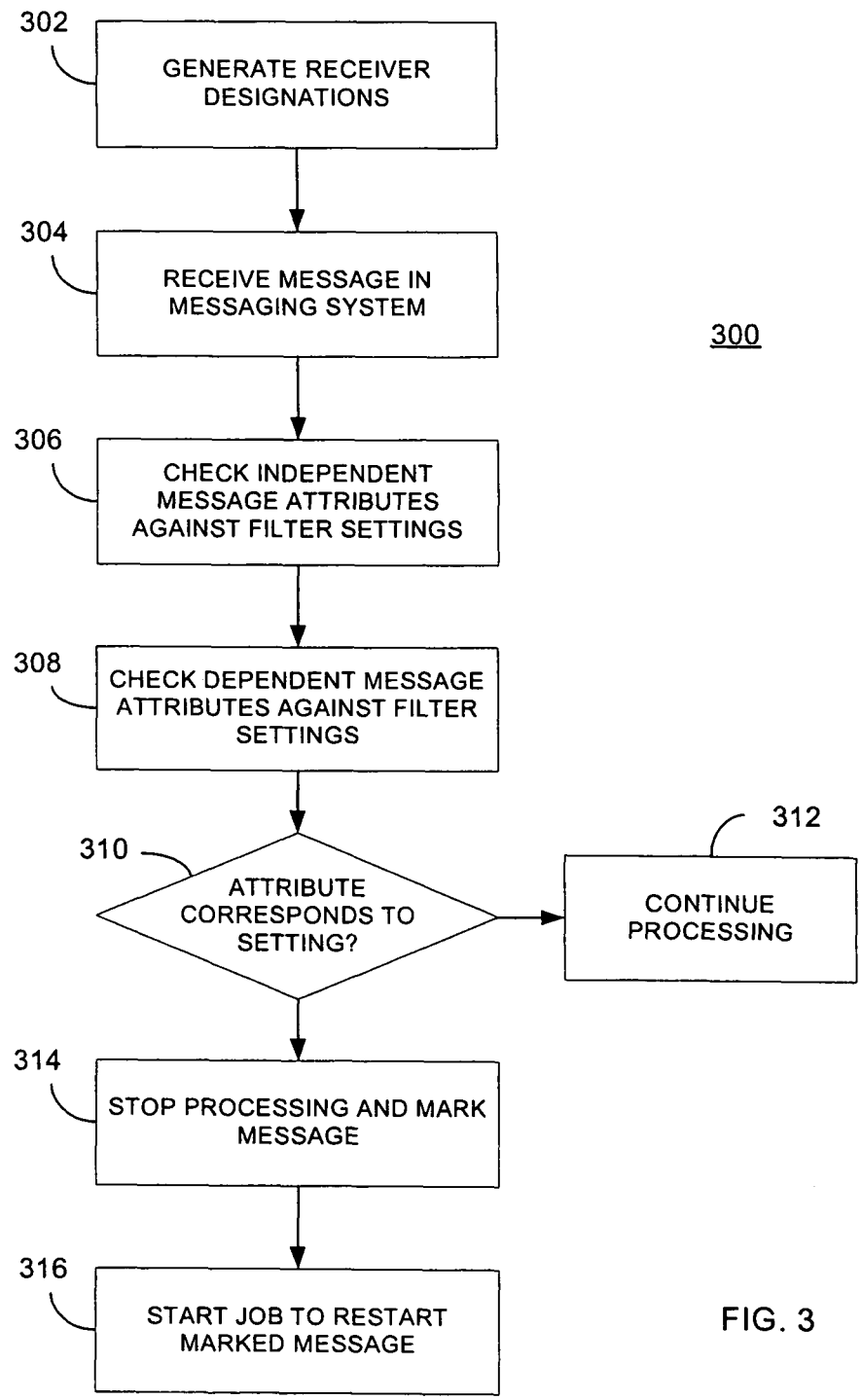
FIG. 3 is a flowchart of a method for filtering messages in a messaging system.

FIG. 3 is a flowchart of a method for time and event based message processing. At 302, receiver designations for a message are generated. In an embodiment, the sender system provides the sender and receiver designations for a message, and sends the message asynchronously to the messaging system. Alternatively, the message is passed to a proxy that provides the sender designation and sends the message asynchronously to the messaging system. The receiver designations are provided by the routing mechanism in the messaging system according to the content of the message.

At 304, the message is received in the messaging system and at filters at various locations therein. Message filter locations can be part of the proxy or part of the messaging system. Message filter locations can be chosen where asynchronous processing occurs, which in and of itself typically requires messages to be persisted or queued. At message filter locations, the attributes of the messages that do not depend on other messages are checked against the filter settings at 306. Filter settings can include sender and receiver details such as identity, operational state, or process role, message size and/or message type, time, or various combinations thereof. Messages that depend on other messages also are checked against the filter settings as well as the attribute queue at 308.

The message filter or group of filters evaluates message according to the filter settings at 310. If no message attribute corresponds to a filter setting, then message processing is continued at 312. If a message corresponds to a particular criterion in the filter settings, the message processing is stopped at 314. The message can be persisted, and marked as "to be processed by a job" including a reference to the job according to which the message will be processed. The message is also marked with all relevant information of the location where the message processing was stopped.

Messages must usually be queued because message information can be updated by another message, and updates must be processed in the correct order. Either the messaging system itself guaranties the processing order, or the receiver system guaranties it. If the messaging system guaranties it, then it needs a queuing system is needed, and processing of the messages can be stopped by simply stopping the queue (e.g. when activating the filter by the UI). If the receiver system controls the order of messages, the messaging system can process the messages in any order (known as "Exactly Once" processing). In this example, no queue identifies the messages. Therefore each message must be analyzed as to whether it should be stopped. If the message filter location uses a queuing system, the message is already stopped because the queue was stopped when the filter was created using the user interface. A log entry may be created stating that the message processing was stopped for this message.

Jobs executed by the message system operating system select the marked messages and restart processing of them at 316. The jobs can be started based on a time and/or event basis. For example, a user may configure to the message filter to resume sending filtered messages automatically after a predefined interval of time, or at a particular time of day. The event can be related to an action of the sender system or a receiver system or an event within the messaging system i.e. a job generates an event for another job after it is finished. The jobs read the message filter location information that belongs to the stopped-processing messages, and start processing the messages at the point at which their processing was stopped.

Although a few embodiments have been described in detail above, other modifications are possible. The logic flows depicted in FIG. 3 do not require the particular order shown, or sequential order, to achieve desirable results. Other embodiments may be within the scope of the following claims.

The invention claimed is:

1. A computer-implemented method of processing asynchronous messages in a messaging system, the method comprising:
    receiving a message sent from a sender system at the messaging system, the messaging system comprising one or more filter locations;
    stopping processing of the message based on evaluation of one or more attributes of the message according to criteria of a filter at one of the filter locations, the evaluated attributes being independent of other messages being processed by the messaging system;
    storing information about the message in a persistence layer of the messaging system, the information comprising the filter location where processing of the message was stopped and a reference to a job according to which the message will be processed, the job defining one or more of a time and an event-related messaging transaction between the sender system and a receiver system according to a predefined set of business processes, the time and event-related messaging transaction being specified by the filter at the filter location where processing of the message was stopped; and
    executing the job by the message system, the executing comprising restarting processing of the message, from the filter location where processing of the message was stopped, based on the information.

2. A method in accordance with claim 1, wherein the information further comprises a receiver identity, a sender identity, or a message size.

3. A method in accordance with claim 1, wherein the job defines an event that comprises an online state of a receiver system to which the message is to be delivered, and wherein the messaging system receives an offline message from the receiver system, stops delivery of the message to the receiver system, stores the messages in the persistence layer, receives an online message from the receiver system, and resumes processing of the message.

4. A method in accordance with claim 1, wherein the job defines a time by which processing of the message is to be restarted.

5. A method in accordance with claim 1, wherein the job includes the information about the message.

6. A method in accordance with claim 1, further comprising queuing the message in a message queue.

7. A method in accordance with claim 6, wherein restarting processing of the message includes processing the message in a queue order specified by the message queue.

8. A method in accordance with claim 7, wherein the queue order includes all messages processed by the messaging system in a time interval.

9. A method in accordance with claim 1, further comprising receiving the job in a filter module.

10. A method in accordance with claim 9, wherein the filter module is connected with the persistence layer.

11. A system for filtering messages in a messaging system, comprising:
    a user interface configured to receive user input for defining one or more message filters, wherein each message filter specifies criteria by which processing of a message is to be stopped, each message filter evaluating one or more attributes of the message according to the criteria, the evaluated attributes being independent of other messages being processed by the messaging system;
    a filter module comprising the one or more message filters;
    a queue connected with the filter module for queuing the message if its processing is stopped;
    a persistence layer that stores information about the message, the information comprising a filter location where processing of the message was stopped and a reference to a job according to which the message will be processed, each job defining one or more of a time and an event-related messaging transaction between the sender system and a receiver system according to a predefined set of business processes, the time and event-related messaging transaction being specified by the filter at the filter location where processing of the message was stopped; and
    a job engine coupled with the messaging system, the job engine running one or more jobs, the message being chosen for the restarting, from the filter location where processing of the message was stopped, based on the information stored in the persistence layer.

12. A system in accordance with claim 11, wherein each job includes a set of business processes to be executed on the message.

13. A system in accordance with claim 12, wherein the time or the event relates to the set of business processes.

14. A system in accordance with claim 11, wherein the job engine is configured to restart processing of the messages according to a queue order.

15. A computer-implemented system for processing messages in a message processing platform, the system comprising:
    a message communication system connected to at least one sender of a message and at least one receiver of the message and comprising one or more filter locations; and
    code running on the message communication system, the code being configured to:
    receive a message sent from a sender system at the messaging system;
    stop processing of the message based on evaluation of one or more attributes of the message according to criteria of a filter at one of the filter locations, the evaluated attributes being independent of other messages being processed by the messaging system;
    store information about the message in a persistence layer of the message communication system, the information comprising the filter location where processing of the message was stopped and a reference to a job according to which the message will be processed, the job defining one or more of a time and an event-related messaging transaction between the sender system and a receiver system according to a predefined set of business processes, the time and event-related messaging transaction being specified by the filter at the filter location where processing of the message was stopped; and execute the job by the messaging communication system, the executing comprising restarting processing of the message, from the filter location where processing of the message was stopped, based on the information.

16. A system in accordance with claim 15, further comprising a queue for storing a copy of the message if its processing is stopped.

17. A computer-implemented method as in claim 1, wherein the job comprises a set of business processes to be executed on the message.

18. A computer-implemented method as in claim 17, wherein the time or the event relates to the set of business processes.

* * * * *